(12) United States Patent
Reiter et al.

(10) Patent No.: US 6,863,304 B2
(45) Date of Patent: Mar. 8, 2005

(54) SAFETY DEVICE FOR A MOTOR VEHICLE

(75) Inventors: Friedrich Reiter, Sindelfingen (DE); Clark Ruedebusch, Renningen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/090,611

(22) Filed: Mar. 6, 2002

(65) Prior Publication Data

US 2002/0125703 A1 Sep. 12, 2002

(30) Foreign Application Priority Data

Mar. 10, 2001 (DE) .......................................... 101 11 566

(51) Int. Cl.$^7$ .............................................. B60R 21/30
(52) U.S. Cl. ..................................................... 280/739
(58) Field of Search ................................ 280/739, 740, 280/741, 742, 736

(56) References Cited

U.S. PATENT DOCUMENTS

| | | | |
|---|---|---|---|
| 3,861,712 A | * 1/1975 | Matsui et al. ................ | 280/735 |
| 5,492,363 A | 2/1996 | Hartmeyer et al. | |
| 5,725,244 A | 3/1998 | Cundill | |
| 5,931,497 A | 8/1999 | Fischer | |
| 6,126,196 A | * 10/2000 | Zimmerman ................ | 280/739 |
| 6,129,380 A | * 10/2000 | Rink et al. ................... | 280/737 |
| 6,250,674 B1 | * 6/2001 | Kreuzer et al. ............. | 280/743.1 |

FOREIGN PATENT DOCUMENTS

| | | |
|---|---|---|
| DE | 21 16 347 | 4/1971 |
| DE | 2116347 | 10/1972 |
| DE | G 88 00 530.5 | 1/1988 |
| DE | 195 29 794 A1 | 8/1995 |
| DE | 195 22 765 A1 | 8/1996 |
| DE | 19522765 | 1/1997 |
| DE | 19628836 | 1/1998 |
| DE | 29720462 | 2/1998 |
| FR | 2136499 | 11/1972 |
| FR | 2527803 | 5/1982 |
| JP | 4717341 U | 3/1971 |
| JP | 4837954 U | 11/1973 |
| JP | 08268213 | 10/1996 |
| JP | 8268213 A | 10/1996 |
| JP | 08268213 A | 10/1996 |
| JP | 8268214 A | 10/1996 |
| JP | 11011250 A | 1/1999 |
| JP | 11198754 A | 7/1999 |
| JP | 11227549 A | 8/1999 |
| JP | 2000052916 A | 2/2000 |
| JP | 2001151059 A | 6/2001 |
| JP | 2002079904 A | 3/2002 |

OTHER PUBLICATIONS

"Controllable Orifice for a Stored Gas Inflator" Research Disclosure, Dec. 1996, Article No. XP000682090.
Search Report.

* cited by examiner

*Primary Examiner*—Faye M. Fleming
(74) *Attorney, Agent, or Firm*—Crowell & Moring LLP

(57) ABSTRACT

A safety device for a motor vehicle has a gas generator, an airbag and at least one orifice through which gas flows. The state of fill of the airbag adjusts automatically to each load case by providing an orifice having a duct shape at least in a partial region. The flow resistance in this partial region adjusts automatically as a function of the velocity of the gas flow flowing through the orifice.

21 Claims, 3 Drawing Sheets

SAFETY DEVICE FOR A MOTOR VEHICLE

This application is related to U.S. patent application Ser. No. 10/200,223, filed Jun. 23, 2002, which has been published as U.S. patent application Publication No. US 2003/0020268 A1.

BACKGROUND AND SUMMARY OF THE INVENTION

The invention relates to a safety device for a motor vehicle with a gas generator and an airbag that is to be filled by the gas generator in the event of an accident, with at least one orifice having a variable flow resistance through which gas can flow.

Safety devices are which have a gas generator and a gas cushion connected to it, an outflow orifice of variable size being arranged on the gas cushion. German Utility Model DE 8800 530 U, for example, discloses an airbag, the outflow orifices of which are closed by closing members made from a flexible deformable material that are provided with an aperture. The cross section of the aperture in the closing part changes as a function of the internal pressure in the gas cushion, i.e. when the airbag is filled to the maximum the cross section is at its greatest and the size of the cross section decreases continuously as the airbag empties.

In this known safety device, the size of the outflow orifice varies automatically, with control being exercised by way of the internal pressure in the airbag in such a way that, when the internal pressure is high—e.g. when the airbag is subjected to severe loading—a lot of gas escapes and, at a low pressure —i.e. when the airbag is subjected to less severe loading—little gas escapes.

However, for optimum protection of the vehicle occupants it is advantageous if the airbag is firmer in the event of a more severe accident (which involves more severe loading of the airbag) in order to absorb more energy, and is softer in the event of a less severe accident (with less severe loading). The same applies to different load cases based on vehicle occupants of different weight. In the case of a heavier vehicle occupant, e.g. a "$50^{th}$ percentile man", the air bag should be adjusted to a harder setting than in the case of a lighter vehicle occupant, e.g. a "$5_{th}$ percentile woman".

German patent document DE 195 29 794 A1 discloses the use of electrical signals to adjust the quantity of gas introduced into the airbag to accommodate the respective load, as a function of measured variables detected by sensors. However, complex electronics are required for such a control system.

Given this prior art, the object of the present invention is to provide a safety device for a motor vehicle with a gas generator and an airbag and at least one orifice, in which the state of fill of the airbag adjusts automatically to the load in a simple manner, such that optimum protection for vehicle occupants is ensured.

These and other objects and advantages are achieved by the safety device according to the invention for a motor vehicle, which includes a gas generator, an airbag and at least one orifice with a variable flow resistance, through which gas can flow. The orifice is configured at least in part in a duct shape region(s) whose flow resistance adjusts automatically as a function of the velocity of the gas flow flowing through the orifice.

As used herein, the word "orifice" is intended to indicate any conceivable orifice that is arranged on the safety device and through which gas flows. One example is an orifice directly on the gas generator, through which gas flows into a feed line to the airbag; another is an orifice in the feed line, through which gas flows from or to the airbag; and yet another is an orifice in the airbag itself. It is apparent that other embodiments may also be provided within the scope of the invention.

The invention makes use of the principle of Bernoulli's pressure equation, according to which the sum of the static, kinetic and geodetic pressure for flowing fluids is constant. In other words, this pressure equation states that if any of these three variables increases, the others decrease accordingly.

In relation to the invention, the geodetic pressure can be disregarded because it is constant, with the result that the relationship explained accordingly applies for the kinetic and the static pressure. Thus, if the kinetic pressure increases, the static pressure decreases. If, as in the invention, the orifice is configured in a duct shape in at least a partial region, allowing a static pressure to form in it that is not immediately equalized by the ambient pressure, Bernoulli's pressure equation applies for this region. If the velocity of the gas flowing through (and thus also the kinetic pressure) increases in the duct-shaped partial region of the orifice, the static pressure in the duct-shaped partial region decreases. Since, in the invention, the duct-shaped flow cross section is variable, it decreases when the static pressure decreases. A decrease in the flow cross section has the effect that the flow resistance increases and hence that less gas can escape. The orifice according to the invention accordingly adapts automatically to the severity of the accident and to the occupant.

Due to the way in which the orifice functions as just described, the following control sequences result when the safety device according to the invention is used if the orifice is an outflow orifice. If the airbag is severely stressed (e.g., in a severe accident or a heavy vehicle occupant), a high pressure arises in the airbag and results in a high flow velocity in the orifice. The high flow velocity leads to a narrowing of the flow cross section of the orifice owing to the principle explained above, so that less gas can escape and the airbag remains hard. This is advantageous in the load cases described—severe accident or heavy vehicle occupant—because a hard airbag can absorb more energy.

If the airbag is less severely stressed (e.g., in a minor accident or a light vehicle occupant), a lower pressure arises in the airbag, resulting in a lower flow velocity. In these load cases, the flow cross section will not narrow as much, so that more gas can escape than in the more severe load case (described above) and the airbag is softer. This is advantageous in the cases of minor accident or light weight, because it is not necessary to absorb as much energy, and an airbag that is too hard would impose an unduly high load on the occupant.

According to one embodiment, the orifice takes the form of an elastic tubular duct. This embodiment is particularly advantageous because it takes up little space and, when folded up, can thus be incorporated easily into an airbag housing with the airbag. Such an outflow orifice is moreover simple to produce. In addition, there is the fact that an orifice designed in this way does not entail any additional risk of injury on the deployed airbag since it is yielding and flexible.

The side walls of the duct can be made gas-permeable (perforated, for example); and the amount of perforation can be used to set the quantity of gas flowing out and to adapt the entire system.

The orifice can be provided directly in the airbag, and can be made from the same material as the airbag itself, which in turn has advantages in terms of manufacture. However, the orifice can also be made in the region of a connecting element between the gas generator and the airbag. In the latter case, there is no need to modify the airbag. Conventional airbag shapes can be used. However, the orifice can also be arranged on or in the gas generator itself.

According to another embodiment of the invention, a closure element, is provided in front of the orifice, in such a way as to be movable relative to the safety device, and extends parallel to the alignment of the orifice. This can take the form of a plate extending across the orifice, for example. The dimensions of the plate must be greater than those of the orifice itself, so that the plate forms duct-shaped regions with the regions of the safety device that surround the orifice, in which duct-shaped regions a static pressure can build up—as in the exemplary embodiment described above. Because of the mobility of the closure element relative to the safety device, the flow resistance of the duct-shaped regions formed by the closure element and the safety device is variable. Here too, this allows control of the flow resistance by means of Bernoulli's pressure equation: at high flow velocities, a reduced pressure arises in the duct-shaped regions, pulling the closure element against the safety device and narrowing the flow cross section; at lower flow velocities, the situation is precisely the reverse.

It is possible to connect the closure element to the safety device by means of springs, so that the static pressure established due to the flow velocity must operate against a defined force. Apart from the springs, it is also possible to provide damping elements. However, any other means of attaching the closure element to the safety device that allows operation as described is also conceivable.

According to another embodiment of the invention, the duct-shaped partial region of the orifice is formed by a plurality of closure elements, which are aligned essentially parallel and extend perpendicularly to the alignment of the orifice. These perpendicular closure elements are designed in such a way that their mutual spacing is variable. This can be accomplished by articulating the closure elements movably on the safety device, by means of hinges, for example. However, they can also be composed of elastic material, the spacing between the closure elements changing through their deformation. It is also conceivable to combine the two variants, namely a hinge and an elastic closure element.

In the exemplary embodiments described so far, the flow resistance of the orifice has been influenced essentially directly by the Bernoulli effect. However, it is also possible to use the Bernoulli effect as an input variable for a control system for controlling the flow resistance, so that the modulation of the orifice can be intensified.

Depending on how the safety device is designed, it can have just one orifice according to the invention or, in addition, a conventional orifice of essentially constant cross section or even inflow and outflow devices of some other kind.

Apart from using a perforation in the duct-shaped region of the orifice, fine tuning of the system can also be achieved by means of special surface configurations. Fine tuning is also possible by means of measures that influence the flow or the pressure, e.g. the shape, material, geometry or number of the outflow orifices.

The orifice can also have means that ensure minimum leakage in the orifice, such as spacers.

The principle according to the invention can be used both when filling an airbag and during outflow. In the latter case, it is not the outflow orifice but the inflow orifice that is designed in such a way that the flow resistance varies as a function of the velocity of the gas flow flowing through the inflow orifice.

According to another feature of the invention, the characteristic or characteristic curve or the behavior of the orifice to be embodied as a function of the direction of flow—filling or outflow. For example, a lever controlled by the direction of flow can change the adjustment of the system. This also includes the possibility of opening or closing additional orifices as a function of the direction of flow (e.g., for inflow or outflow).

Other objects, advantages and novel features of the present invention will become apparent from the following detailed description of the invention when considered in conjunction with the accompanying drawings.

DETAILED DESCRIPTION OF THE DRAWINGS

Figure 1:
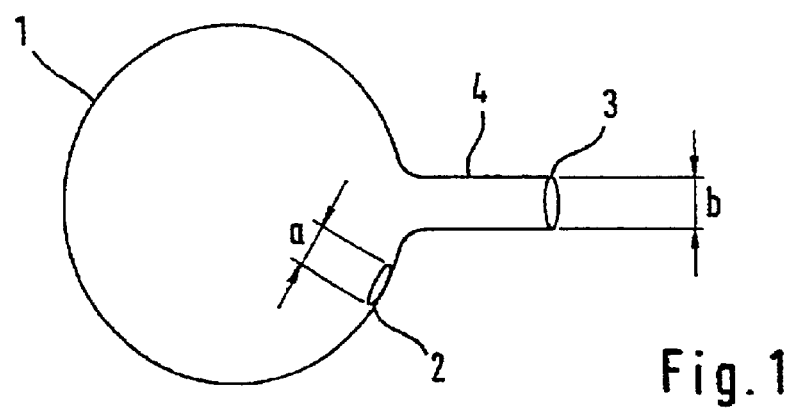
FIG. 1 shows a safety device according to the invention with a tubular outflow duct.

FIG. 1 illustrates an airbag 1 of a safety device according to the invention. (A gas generator, which likewise belongs to the safety device, is not illustrated in this figure, for the sake of clarity.) The airbag 1 is provided with an outflow orifice 2, the flow cross section a of which is essentially constant. The airbag 1 has another outflow orifice 3, in the form of a flexible tubular duct 4. Because the duct 4 is made of elastic material, the size of the flow cross section b is variable. The outflow orifice 2 is used to adapt the overall system.

If gas flows out of the interior of the airbag 1 through the outflow orifices 2 and 3, the size of flow cross section a remains constant, while the size of flow cross section b depends on the flow velocity and obeys Bernoulli's pressure equation. At a high outflow velocity, the duct 4 automatically contracts and at a lower outflow velocity it automatically re-expands. As a result, outflow orifice 3 is adjusted automatically in accordance with a load case that has occurred, and the behavior of the airbag 1 is ideally adapted to this load case.

Figure 2:
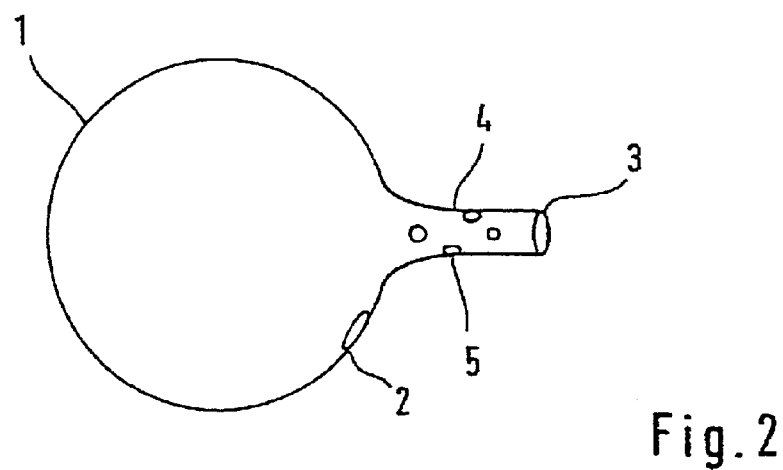
FIG. 2 shows a safety device in accordance with FIG. 1, in which the outflow duct is perforated.

The exemplary embodiment illustrated in FIG. 2 differs from that in FIG. 1 in that a plurality of holes 5 are formed in the duct 4. The overall system can be adapted even more finely by means of the number and size of the holes 5.

Figure 3:
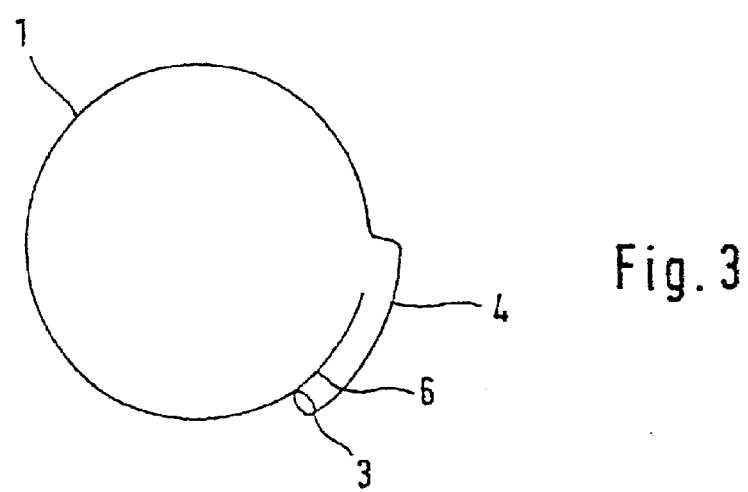
FIG. 3 shows a safety device in accordance with FIG. 1, in which the outflow duct is connected releasably to the airbag along the length of the duct.

FIG. 3 illustrates a safety system according to the invention, in which the duct 4 is attached to the airbag 1 along its length by means of a tear seam 6. If the tear seam 6 also closes the orifice 3 of the duct 4 and is undone only when the airbag 1 is inflated, the outflow orifice 3 is closed at the beginning of the inflation process of the airbag 1, with the result that a lower leakage rate is achieved during the inflation process. As a result, the airbag can be inflated more quickly and its protective action can become effective more quickly. FIG. 3 illustrates the state in which the airbag 1 is being inflated and only a very small amount of gas, if any, is emerging from the outflow orifice 3. The same effect can be achieved if the duct 4 is folded into the airbag in such a way that the outflow orifice 3 is opened only when the airbag is inflated. It is also conceivable to achieve the same function by means of a labyrinth or serpentines formed in the duct 4. The duct 4 can also be closed at the beginning of the inflation process by a closure made from a material capable of stretching, which exposes the duct 4 only at a certain minimum pressure in the airbag 1.

If, in the exemplary embodiments described above, the duct 4 is made curved or the outflow orifice deflects the gas sideways, the outflowing gas and the duct 4 deflect each other. This causes the duct 4 to kink, increasing its flow resistance. As a result, the effect that occurs on the basis of Bernoulli's pressure equation, namely that the flow cross section decreases as the flow velocity increases and the flow resistance thus increases, with the result that less gas escapes, is intensified. The same effect can be achieved if the duct 4 is designed in such a way that it begins to flap or pulsate above a certain flow velocity. These movements of the duct 4 likewise increase the flow resistance.

Figure 4:
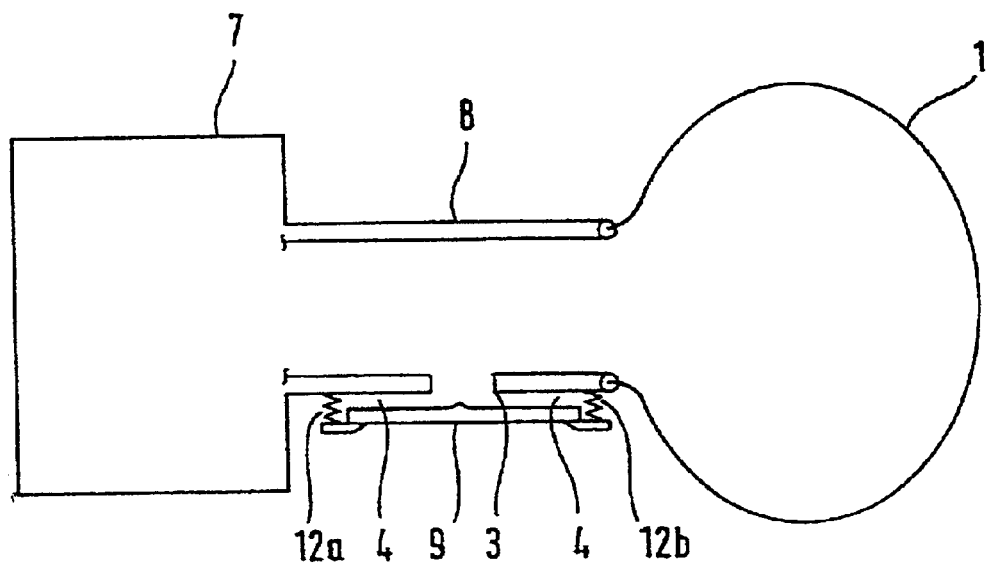
FIG. 4 shows a safety device according to the invention, in which the outflow orifice is arranged in a connecting element between the gas generator and the airbag and has a closure element arranged parallel to the alignment of the outflow orifice.

In addition to the airbag 1, FIG. 4 also illustrates a gas generator 7 and a connecting element 8 between the gas generator 7 and the airbag 1. Components that correspond to those in the exemplary embodiments described above are provided with the same reference numerals. In this exemplary embodiment, the variable outflow orifice 3 is not formed on the airbag 1 itself but in the connecting element 8 between the gas generator 7 and the airbag 8. A plate 9, which acts as a closure element, is arranged in front of the outflow orifice 3. The plate is mounted in such a way that it can move relative to the connecting element 8—more specifically by means of springs 12*a* and 12*b* —and is aligned in such a way that it extends essentially parallel to the outflow orifice 3. The springs 12*a* and 12*b* can be made damped or undamped in accordance with the particular application.

The relationship between flow velocity and flow cross section can be adjusted in a particularly simple manner by means of the strength of the springs and of the damping. With the plate 9, the outsides of the connecting element 8 form duct-like passages 4. A static pressure can build up in these passages 4, so that Bernoulli's equation can therefore be applied once again to this flow region when gas in the airbag 1 is flowing out. Depending on the flow velocity in the passages 4, a certain static pressure arises in them, moving the plate 9 either towards the outflow orifice 3 or away from it, thereby adjusting the flow cross section of the passages 4.

Figure 5:
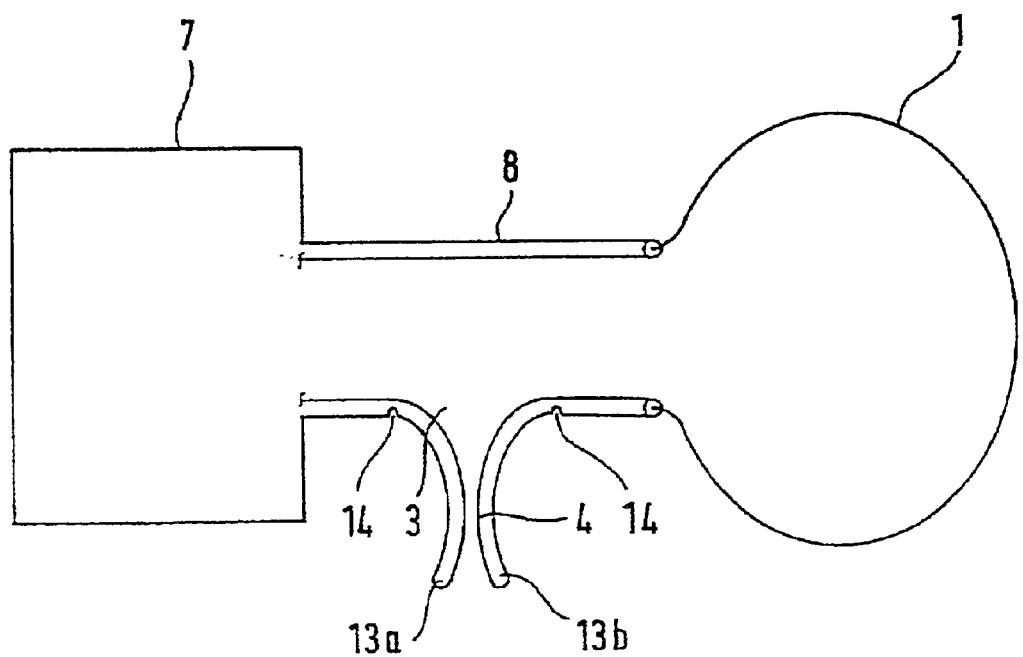
FIG. 5 shows a safety device in accordance with FIG. 4 with a plurality of closure elements extending perpendicularly to the alignment of the outflow orifice.

The exemplary embodiment illustrated in FIG. 5 differs from that illustrated in FIG. 4 in that, instead of one plate 9 aligned essentially parallel to the alignment of the outflow orifice 3, two plates 13*a* and 13*b* aligned essentially perpendicular to the alignment of the outflow orifice 3 and serving as closure elements are provided. The plates 13*a* and 13*b* form the duct-shaped partial region 4 of the outflow orifice 3. They can be articulated on the connecting element 8—by means of hinges 14, for example. However, they can also be made plastic themselves. These two variants provide a change in the flow cross section of the duct-shaped region 4, this once again taking place automatically by means of the flow velocity.

In the two exemplary embodiments just described, it is also conceivable for an outflow orifice with an essentially constant flow cross section to be provided in addition to an outflow orifice 3 according to the invention. It is also possible for a plurality of outflow orifices 3 of variable cross section to be provided on a safety device. Combination with'known outflow valves and outflow orifices is also conceivable.

To configure the safety device according to the invention in an optimum manner for the respective application, it is possible to provide different coatings or surface structures on the inner surfaces of the duct-shaped partial region 4 of the outflow orifice 3 in all exemplary embodiments. A sharkskin structure, a golf ball surface, pronounced woven structures or the already mentioned perforations are conceivable. These must be configured accurately in order to optimize the flow for the load case. The duct-shaped partial region 4 can furthermore be optimized in terms of flow by means of its shape, e.g. by means of rounded edges etc.

To intensify the increasing flow resistance as the flow velocity increases, it is also possible to provide measures that disturb the flow and are triggered when a certain static pressure is undershot, for example. Such flow-disturbing measures are particularly effective when they produce turbulent flow and thereby abruptly increase the flow resistance. An abrupt variation in the gas flow emerging is thereby achieved.

Figure 6:
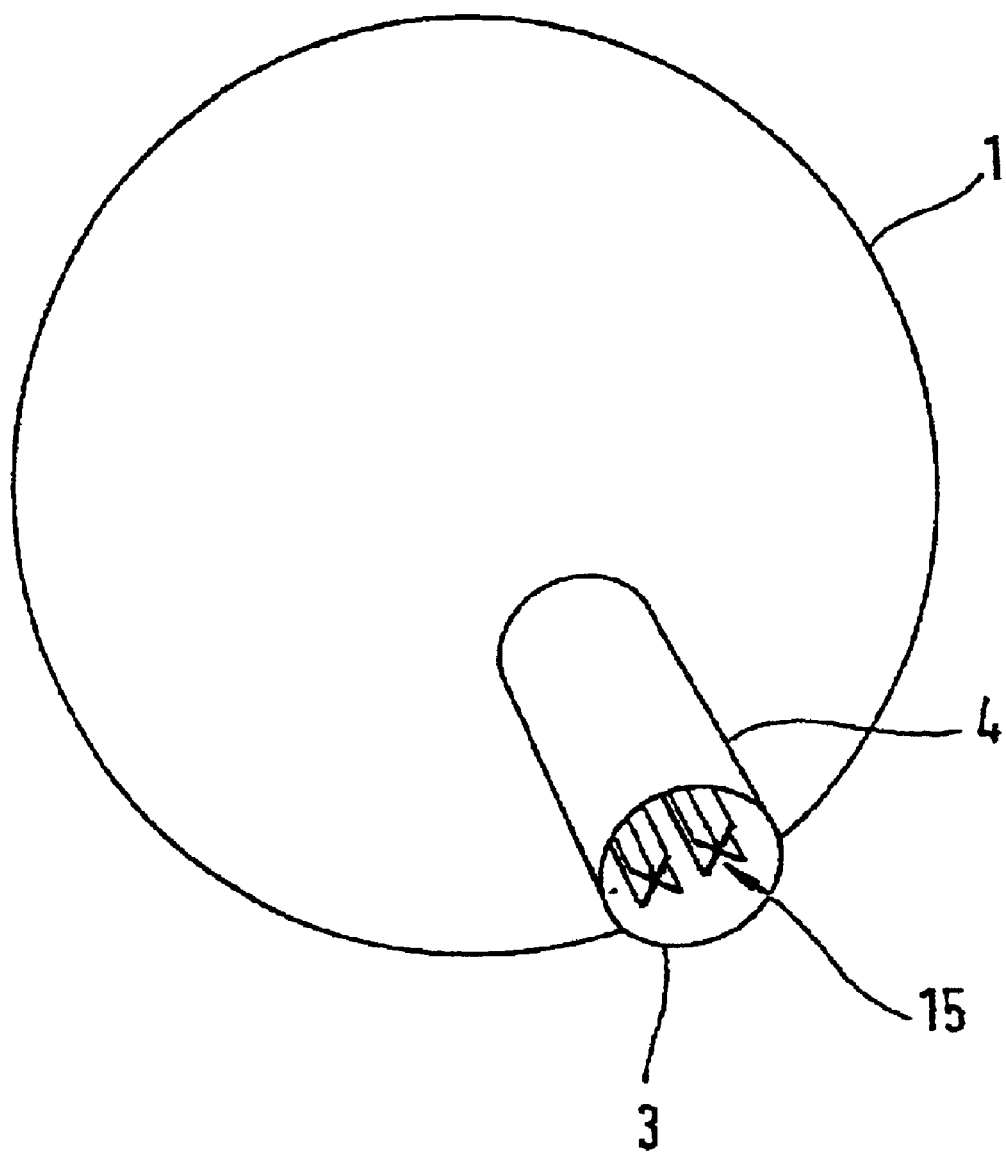
FIG. 6 shows a spacer for an outflow orifice according to the invention.

FIG. 6 illustrates a spacer 15 for an outflow orifice 3. This spacer 15 ensures that the outflow orifice is always open to such an extent that air can escape from the airbag 1. In FIG. 6, the spacers 15 are embodied in a cross shape. However, any other embodiment of the spacers 15 that performs the function described is also conceivable.

The designs of orifices described can be provided for all conceivable orifices in or on the safety device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A safety device for a motor vehicle comprising:
 a gas generator;
 an airbag connected to be filled by the gas generator in the event of an accident; and
 at least one orifice, through which gas can flow and a flow resistance of which is variable; wherein
 the orifice is duct shaped, at least in a partial region;
 the duct-shaped partial region has a flow resistance which adjusts automatically as a function of flow velocity of gas flowing through the orifice; and
 said flow resistance increases with increasing flow velocity of gas flowing through said orifice.

2. The safety device according to claim 1, wherein the orifice comprises a tubular duct having a cross sectional area which is elastically expandable.

3. The safety device according to claim 1, wherein said duct shaped partial region of the orifice comprises a movable closure element, which extends parallel to the alignment of the orifice and is arranged in front of the orifice, and cooperates with regions of the safety device that surround the orifice.

4. The safety device according to claim 3, wherein the closure element is spring-loaded.

5. The safety device according to claim 1, wherein
the duct shaped partial region comprises at least two closure elements which are aligned essentially parallel, extend approximately perpendicularly to the alignment of the orifice and are mounted in front of the orifice.

6. The safety device according to claim 5, wherein the closure elements are movably supported.

7. The safety device according to claim 5, wherein the closure elements comprise an elastic material.

8. The safety device according to claim 1, wherein at least a pressure parameter that occurs in the duct-shaped partial region owing to Bernoulli's pressure equation is used as an input variable for a control process for adjusting the flow resistance.

9. The safety device according to claim 1, wherein side walls of the duct-shaped partial region are gas-permeable.

10. The safety device according to claim 1, wherein the side walls of the duct-shaped partial region have at least one of the following characteristics:
they are perforated; and
their inner surfaces have a contoured surface configuration.

11. The safety device according to claim 1, wherein the orifice is formed in the airbag.

12. The safety device according to claim 1, wherein the orifice is arranged in a region of a connecting element between the gas generator and the airbag.

13. The safety device according to claim 1, wherein the orifice is formed in the gas generator.

14. The safety device according to claim 1, wherein, in addition to the self-adjusting orifice, the safety device further comprises at least a second orifice.

15. The safety device according to claim 14, wherein, the second orifice has an essentially constant size.

16. The safety device according to claim 1, further comprising means for ensuring minimum leakage, provided in the orifice.

17. The safety device according to claim 1, wherein one of a characteristic, a characteristic curve, behavior and a flow path of the safety device is adjustable as a function of a direction of gas flow.

18. A method of regulating a pressure response in an airbag of a vehicle airbag safety restraint system, comprising:
providing an orifice for flow of gas into or out of said airbag; and
adjusting a fluid flow resistance of said orifice as a function of a flow velocity of gas flowing through said orifice;
wherein said adjusting step comprises increasing said fluid flow resistance with increasing flow velocity of said gas.

19. The method according to claim 18, wherein:
said orifice is provided in the form of an elastic duct; and
said adjusting step comprises expanding and contracting a cross sectional area of said elastic duct in response to pressure in said gas flowing through said orifice.

20. The method according to claim 18, wherein said adjusting step comprises adjusting a cross sectional area of said orifice as an inverse function of said flow velocity.

21. The method according to claim 1, wherein said duct-shaped region has a cross sectional area that varies inversely with the flow velocity of gas flowing through the orifice.

* * * * *